United States Patent Office 3,526,926
Patented Sept. 8, 1970

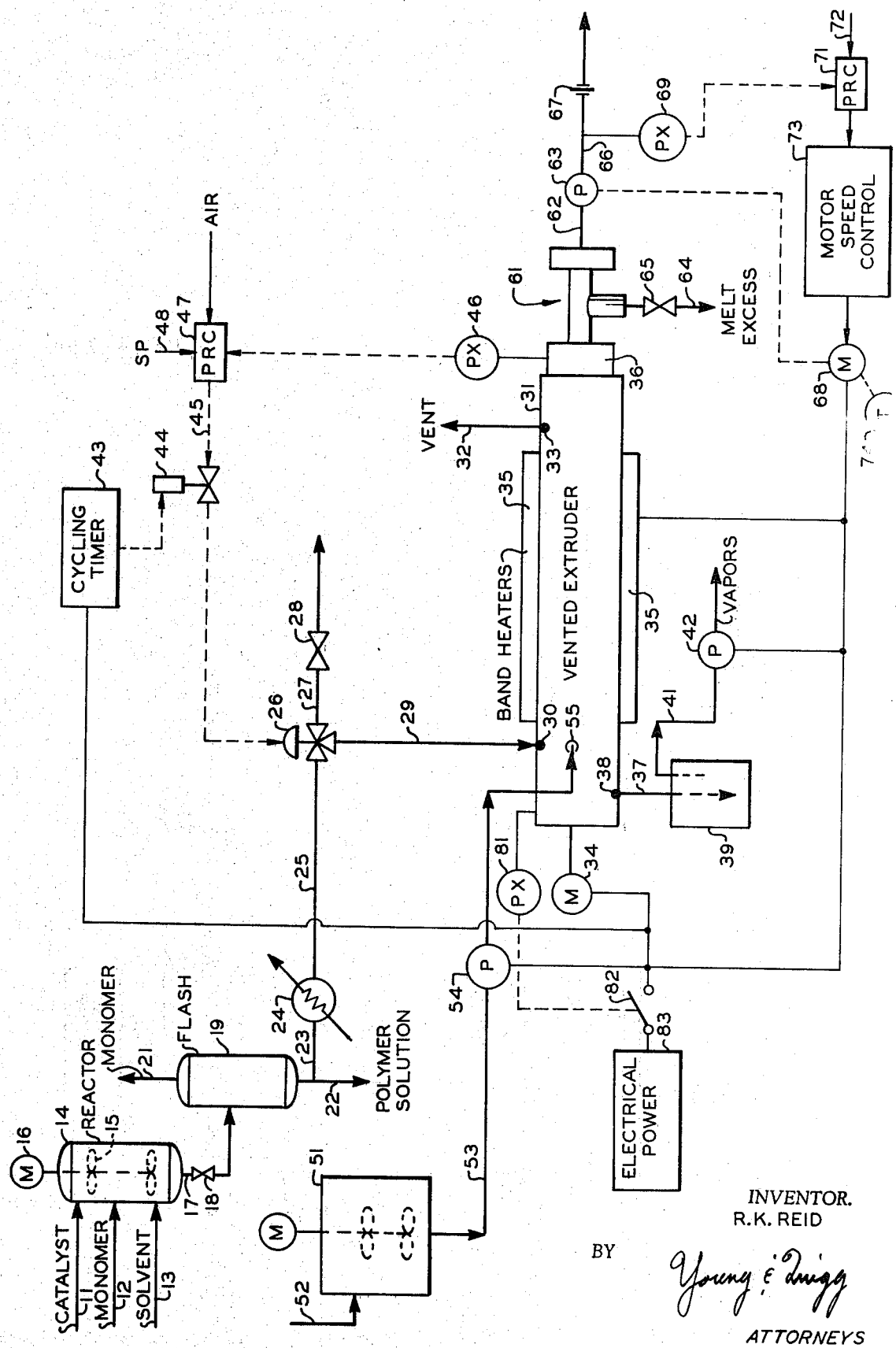

3,526,926
POLYMER EXTRUSION SAMPLING SYSTEM
Richard K. Reid, Bartlesville, Okla., assignor to Phillips Petroleum Company, a corporation of Delaware
Filed May 17, 1968, Ser. No. 730,065
Int. Cl. B29h 21/00
U.S. Cl. 18—2                                                  7 Claims

ABSTRACT OF THE DISCLOSURE

Polymerization reaction effluent is flashed to remove unreacted monomer, and a portion of the remaining solution of normally solid polymer in solvent is heated and injected into a vented extruder. A polymer trap is located below and connected to a vacuum port in the bottom of the extruder upstream of the feed inlet. A vacuum pump is connected to the polymer trap for removal of flashed solvent. The sample solution is injected into the extruder at a rate responsive to the extruder die pressure. A pressure limit switch deenergizes the sampling system if the pressure in the feed section of the extruder exceeds a predetermined value. A portion of the extrudate is passed to a melt index analyzer.

---

The invention relates to means for removing solvent from a polymer solution. In one aspect the invention relates to a polymer sampling system for obtaining a polymer sample from a solution thereof. In a more specific aspect the invention relates to a sampling system for use with a melt index analyzer to determine the melt index of polymer being produced in a solution polymerization reactor.

Solvent sampling systems utilizing a vented extruder with the feed section being maintained under a vacuum have had problems of the vacuum line becoming plugged with polymer, excessive pressure buildup in the extruder feed section, variable polymer throughput and variable degree of crosslinking of the polymer. Accordingly it is an object of the invention to provide an extruder system for the removal of solvent from a polymer solution which aviods or minimizes these problems. It is an object of the invention to provide an improved polymer sampling system which utilizes an extruder with the feed section thereof maintained under subatmospheric pressure. It is an object of the invention to minimize plugging of the conduit connecting a vacuum pump to the feed section of an extruder. It is a further object of the invention to reduce or eliminate the dangers accompanying an excessive pressure in a desolventizing extruder. It is still another object of the invention to provide a uniform flow rate of polymer through a devolatilizing extruder.

Other objects, aspects and advantages of the invention will be apparent from a study of the specification, the drawing and the appended claims to the invention.

Referring now to the drawing, there is illustrated a diagrammatic representation of a polymer sampling system in accordance with the invention. Catalyst, monomer and solvent are passed through conduits 11, 12 and 13 into polymerization reactor 14. A stirrer 15, mounted within reactor 14 is rotated by motor 16. Reactor 14 is operated under polymerization conditions at which the solvent is in the liquid phase to produce a normally solid polymer, which is at least partially soluble in the polymerization solvent. The polymerization reaction effluent is withdrawn from reactor 14 and passed by way of conduit 17 and valve 18 into flash tank 19. Unreacted monomer is withdrawn from an upper portion of tank 19 by way of conduit 21. A solution of polymer in solvent is withdrawn from a lower portion of tank 19 and passed by way of conduit 22 to further processing. The polymer concentration in the solution will depend upon the particular process, but in general will be in the range of about 5 to 50 weight percent. A small sample portion of the polymer solution is withdrawn from conduit 22 and passed by way of conduit 23 into and through indirect heat exchanger 24 to heat the sample. The thus heated sample is passed through conduit 25 to the inlet of three-way valve 26. One outlet of valve 26 is connected through conduit 27 and manually positionable valve 28 to a dump or other point of collection of unused sample. Valve 28 can be adjusted for a continuous flow of sample through conduit 25, or it can be shut except when required to purge conduit 25. The remaining outlet of valve 26 is connected through conduit 29 to the polymer inlet 30 of vented extruder 31.

While the location of the sample point on the outlet of reactor 14, by connecting conduit 23 to conduit 17, would be ideal from the standpoint of a minimum time lag between a change in the reaction and the measurement of the effect of this change on the resulting polymer, the amount of unreacted monomer in the sample might vary due to varying reactor conditions. The unreacted monomer would be separated from the polymer in extruder 31, but might result in variations in the feed rate of polymer to the extruder as well as variations in the pressure maintained in the feed section of extruder 31. The location of sample line 23 downstream of flash tank 19 avoids many of the difficulties of the variable unreacted monomer concentration in the reactor effluent, while increasing the time lag only slightly.

Extruder 31 can be either a twin screw vented extruder or a single screw vented extruder. A single screw extruder having a feed section, a first metering section, a vent section and a second metering section in that order is presently preferred. Conduit 32 connects a vent port 33 in the vent section of extruder 31 with the atmosphere or other venting means. Extruder 31 is provided with a drive motor 34 and band heaters 35. A die plate 36 is mounted on the extrudate outlet of extruder 31. Conduit 37 extends downwardly from a port 38 in the bottom half of extruder 31 into polymer trap 39. Port 38, like inlet 30 and vent port 33, communicates with the barrel or extrusion cylinder of the extruder 31. Conduit 41 provides communication between an upper portion of polymer trap 39 and vacuum pump 42.

The sample passing through heat exchanger 24 is heated to a temperature at which the solvent will be varporized when introduced into the low pressure environment maintained in the feed section of extruder 31 by vacuum pump 42. While the pressure employed can vary with the particular polymer, the solvent, and the solvent concentration, in one system processing polymers of ethylene in a cyclohexane solvent the pressure in the feed section of extruder 31 is maintained at about 24 to about 26 inches mercury vacuum when valve 26 closes the inlet to conduit 29 and about 10 to about 20 inches mercury vacuum when valve 26 opens the inlet to conduit 29. The temperature in the feed section of extruder 31 will be maintained sufficiently above the boiling point of the solvent to minimize the condensation of solvent vapor, while the temperature to which the solution is heated in exchanger 24 is sufficiently high to insure that substantially all of the solvent will be flashed to vapor upon injection into the feed section of extruder 31. For the polyethylene-cyclohexane system, extruder 31 is maintained at a temperature on the order of 400° F. while the solution is heated to approximately 350° F. in heat exchanger 24.

Port 38 is located upstream of polymer inlet port 30 to minimize the amount of polymer which enters conduit 37. Port 38 is located in the bottom half of extruder 31 and conduit 37 extends directly downwardly through the top of polymer trap 39 so that any polymer which does enter conduit 37 will pass immediately into trap 39 rather than agglomerating on the inner wall of conduit 37 as would occur if conduit 37 were connected to a port in the upper half on extruder 31. Such agglomeration would eventually cause plugging of conduit 37. Polymer trap 39 prevents polymer particles from entering conduit 41, which can be of significantly greater length than conduit 37, and even into pump 42. Trap 39 can be made of glass to permit visual observation of the level of polymer accumulation. The operator can empty trap 39 in less than five minutes, which is insignificant in comparison to the time which would be required to clean conduit 41 and pump 42 in the absence of a trap 39. Thus most of the solvent in the vapor state is removed from the extruder by way of conduit 37, and substantially all of any remaining solvent is withdrawn by way of conduit 32 from the vent section of extruder 31.

Pneumatic valve 26 is cycled opened and shut by the cycling timer 43 actuating the on-off solenoid valve 44 in the air supply line 45 to the diaphragm of pneumatic valve 26. Timer 43 can operate valve 44 for any desired cycle to provide the desired feed rate of polymer solution into extruder 31. The valve 44 will generally be opened for a time in the range of about 0.1 to 1 second and then closed for a period of time in the range of about 1 to 10 seconds. The ratio of the length of the open period to the length of the closed period is more significant, within broad limits, then the actual values of the periods, and will generally be in the range of about 1/30 to about 1/1, and preferably in the range of about 1/10 to about 1/2.

Pressure sensor 46 determines the pressure of the polymer melt in the outlet end of extruder 31, preferable in die plate 36 downstream of the extruder breaker plate. The die pressure is representative of the flow rate of polymer to extruder 31. Sensor 46 transmits to the measurement input of pressure recorder controller 47 a signal representative of the die pressure measurements. Controller 47 compares the measurement signal with the desired pressure represented by the setpoint 48 and produces an output pressure signal repersentative of the comparison. This output signal is applied to conduit 45 to serve as the air supply to valve 26. Thus timer 43 determines when and how long valve 26 is open, and the controller 47 determines the extent to which valve 26 is opened during its open periods. Controller 47 thereby varies the rate of introduction of polymer solution into extruder 31 to maintain the measured pressure at die plate 36 substantially constant at the desired value. This provides for a substantially constant flow rate of polymer through extruder 31, thus minimizing the effect of variation in degradation of the polymer which would occur with the variable residence time accompanying a variable polymer flow rate. Prolonged exposure of the polymer to the high extruder temperature causes cracking and degradation at low feed rates.

If desired, suitable stabilizers for the polymer can be introduced into stirred tank 51 by way of conduit 52. Conduit 53, containing metering pump 54, provides communication between tank 51 and an inlet port 55 in extruder 31.

The inlet of T connection 61 is connected to the outlet opening of die plate 36. Conduit 62 connects one of the T outlets to the inlet of gear pump 63. Conduit 64, containing manually adjustable valve 65, connects the other T outlet to a dump for the melt which is in excess of the requirements of gear pump 63. Conduit 66 containing an orifice 67 is connected to the outlet of pump 63, which is driven by variable speed motor 68. Pressure sensor 69 applies to the measurement input of pressure recorder controller 71 a signal representative of the pressure of the polymer melt in conduit 66 upstream of orifice 67. Controller 71 compares this signal with the desired pressure represented by setpoint 72 and produces an output signal responsive to the comparison. The output signal is applied to motor speed control 73 to vary the speed of motor 68, and thus the pumping rate of pump 63, to maintain the pressure in conduit 66 upstream of orifice 67 substantially constant. The speed of motor 68, as indicated by tachometer 74, is representative of the melt index of the polymer, as disclosed in De Haven, U.S. Pat. 3,048,030, issued Aug. 7, 1962.

If vacuum pump 42 should become inoperative or if conduits 37 or 41 should plug, it would be possible to build up a very high pressure in the feed section of extruder 31. Since the extruder 31 is electrically heated with band heaters 35 whose surface temperature can be above the auto-ignition temperature of the solvent, a definite explosion hazard would exist if any solvent vapors were to leak out of the extruder feed section. Accordingly, pressure limit sensor 81 is connected to the feed section of extruder 31. If the pressure in the feed section of extruder 31 exceeds a predtermined value, sensor 81 opens switch 82, disconnecting timer 43, pump 54, motor 34, vacuum pump 42, band heaters 35 and motor 68 from the source 83 of electrical power. While a single pressure sensor 81 and a single switch 82 are illustrated, more than one of each can be utilized, with the switches being operated at the same or different values of pressure.

The following example is presented in further illustration of the invention and should not be construed in undue limitation thereof.

EXAMPLE

A vented extruder was connected as illustrated in the drawing to a sample stream taken from the flashed polymer solution obtained from a monomer flash tank immediately downstream of a reactor in a commercial plant for producing normally solid polyethylene in cyclohexane solvent. The extruder 31 had a 1-inch inside diameter barrel 20 inches long. The interior of the barrel in the feed section, about the first 5 inches of the barrel, was grooved about its periphery with longitudinal grooves ⅛ inch wide and ¹⁄₁₆ inch deep. The grooves were spaced about ⅛ inch apart.

The feed inlet port 30 was ⁷⁄₁₆ inch in diameter. The longitudinal center line of the feed inlet was a tangent to the inner periphery of the barrel represented by the bottom of the grooves. That portion of the feed inlet port wall that did not intersect the barrel was sloped so as to make a smooth transition into the barrel wall. The feed inlet port 30 was positioned 3 inches from the feed end of the extruder.

The vapor outlet port 38 was about ¹¹⁄₁₆ inch in diameter and was spaced one inch from the feed end of the extruder in the bottom of the extruder barrel. Trap 39 was emptied about once a week. Significantly less plugging of line 37 was encountered as compared to operation with port 38 being in the upper half of extruder 31.

The extruder screw flights were 1 inch apart at the periphery so that the vapor outlet was 1 flight and the feed inlet was 3 flights from the end of the screw. The screw was designed to provide a compression ratio of 3 to 1 although other screws with compression ratios up to 13 to 1 can be used.

The outlet port of the flash valve 26 was positioned in the feed inlet port 30 of the extruder so that the material was flashed substantially directly into the screw flights. The valve outlet was a sharp orifice flush with the exterior of the valve body and was closed by a needle inside the valve body so that the flashing occurred outside the valve body. The flashed material contacted the valve body interior only at the edge of the orifice. The outlet port of the valve was ¹⁄₃₂ inch in diameter so that the area of the open port was about 0.0008 square inch.

The valve 26 was intermittently operated by timer actuated valve 44 passing air to a diaphragm attached to the needle of valve 26. The timer 43 can operate the valve over a practical range of opened 0.1 to 1 second and closed 1 to 10 seconds. Time cycles of opened 0.5 second and closed 3 to 5 seconds have been found particularly satisfactory. Controller 47 varied the air pressure to position valve 26 to maintain a die pressure of approximately 300 p.s.i.g. to provide a polymer flow rate of approximately 0.8 lb./hr.

The sample stream of solution was heated to about 350° F. in heater 24, while extruder 31 was maintained at a temperature of about 400° F. The pressure in the feed section of extruder 31 was maintained at approximately 25 inches mercury vacuum with valve 26 closed and about 15 inches mercury vacuum with valve 26 open. Pressure limit sensor 81 was set to open switch 82 at a pressure of 14.7 p.s.i.a. The composition of the solution, excluding the small amount of catalyst, was about 10 weight percent polyethylene and about 90 weight percent cyclohexane.

The melt index of the polymer was determined to be about 6.5 at approximately 20 minutes after the sample stream was withdrawn from the reactor.

Although the invention has been described as applied to sampling polymer solution from a reactor, the invention can be utilized for separating polymer from solvent in general. Thus, the process and apparatus of the invention can be utilized for separating polymer product from solvent in a process for producing solid polymer.

Reasonable variation and modification are possible within the scope of the foregoing disclosure, the drawing and the appended claims to the invention.

I claim:

1. Apparatus comprising a screw extruder having a polymer inlet and an extrudate outlet; a vacuum port located in the bottom half of said extruder; said inlet, said outlet and said vacuum port being in communication with the barrel of said extruder; said inlet being located downstream of said vacuum port; a polymer trap positioned below said extruder; first conduit means extending downwardly from said vacuum port into an upper portion of said polymer trap; a vacuum pump having an inlet and an outlet; and second conduit means connected between an upper portion of said polymer trap and said inlet of said vacuum pump.

2. Apparatus in accordance with claim 1 further comprising a first valve means having an inlet and an outlet; said outlet of said first valve means being in communication with said polymer inlet of said extruder; a source of a solution of polymer in a solvent therefor; third conduit means connected between said source and said inlet of said first valve means; a pressure controller having a measurement input, a setpoint and an output; a pressure sensing means positioned to measure the pressure of the polymer melt at said extrudate outlet and to apply a signal representative thereof to said measurement input of said controller; and means for periodically applying said output of said controller to said first valve means to actuate said first valve means to pass polymer solution into said polymer inlet of said extruder at a rate responsive to said pressure of the polymer melt at said extrudate outlet.

3. Apparatus in accordance with claim 2 wherein said first valve means is a pneumatically actuated valve having a pneumatic control signal input; and wherein said means for periodically applying comprises an air line connected between said output of said controller and said pneumatic control signal input of said pneumatically actuated valve; a second valve means operatively positioned in said air line; and means for periodically opening said second valve means.

4. Apparatus in accordance with claim 3 further comprising electrical driving means for driving said extruder; at least one electrical band heater positioned around said extruder; a source of electrical power; switching means adapted to connect said source of electrical power to said electrical driving means, said band heater, said vacuum pump and said means for periodically opening said second valve means; second pressure sensing means connected to the feed section of said extruder for actuating said switching means to disconnect said source of electrical power when the sensed pressure in the feed section of said extruder exceeds a predetermined value.

5. Apparatus in accordance with claim 4 further comprising means for metering at least one polymer stabilizer into said extruder.

6. Apparatus in accordance with claim 4 wherein said extruder is provided with a vent port located between said polymer inlet and said extrudate outlet.

7. Apparatus in accordance with claim 1 wherein said first and second conduit means are connected to said polymer trap to cause a change in the direction of flow of the solvent vapors as the solvent vapors pass from said first conduit means through said polymer trap to said second conduit means.

References Cited

UNITED STATES PATENTS

| | | | |
|---|---|---|---|
| 3,156,009 | 10/1964 | Alsys | 18—12 |
| 3,350,742 | 11/1967 | Wood | 18—12 |
| 3,409,937 | 11/1968 | Klosek et al. | 18—12 |

FOREIGN PATENTS 700,412  12/1964  Canada.

WILLIAM J. STEPHENSON, Primary Examiner

U.S. Cl. X.R.

18—12